United States Patent Office 2,911,447
Patented Nov. 3, 1959

2,911,447
PREPARATION OF POLYCYCLIC HALOGENATED COMPOUNDS

Louis Schmerling, Riverside, Ill., assignor, by mesne assignments, to Universal Oil Products Company, Des Plaines, Ill., a corporation of Delaware No Drawing. Application March 1, 1954
Serial No. 413,461

6 Claims. (Cl. 260—648)

This invention relates to a process for preparing polycyclic halogenated compounds, and more particularly to a method for preparing tetracyclic compounds containing halogen atoms on only two rings.

An object of this invention is to prepare polycyclic halogenated compounds possessing insecticidal properties.

A further object of this invention is to prepare insecticides consisting of tetracyclic polychlorinated compounds.

One embodiment of this invention resides in a process for preparing halogenated polycyclic compounds by reacting a cycloalkadiene with a haloolefin having the formula:

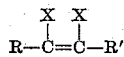

in which R and R' are independently selected from the group consisting of alkyl, haloalkyl and hydrogen radicals, and X is independently selected from the group consisting of halogen and hydrogen radicals, at least one X being halogen, condensing the resultant halogenated bicyclic compound with a polyhalocycloalkadiene to form a halogenated tetracyclic compound, and completely dehalogenating one ring of the latter compound.

A specific embodiment of this invention is found in the preparation of a halogenated polycyclic compound which comprises reacting cyclopentadiene with a haloolefin having the formula:

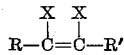

in which R and R' are independently selected from the group consisting of alkyl, haloalkyl and hydrogen radicals and X is independently selected from the group consisting of hydrogen and halogen radicals, at least one X being halogen, condensing the resultant halogenated bicyclic compound with hexachlorocyclopentadiene to form a halogenated tetracyclic compound, and completely dehalogenating one 6-membered carbon atom ring.

A more specific embodiment of the invention resides in the preparation of a chlorinated polycyclic compound by reacting cyclopentadiene with 1,2-dichloroethylene to form 5,6-dichlorobicyclo [2.2.1]-2-heptene, condensing said compound with hexachlorocyclopentadiene to form a chlorinated tetracyclic compound and completely dehalogenating one 6-membered carbon atom ring of the latter compound by treating said compound with zinc in an alcoholic solution to form 1,2,3,4,10,10-hexachloro-1,4,4a,5,8,8a-hexahydro-1,4,5,8-dimethanonaphthalene.

Other objects and embodiments of this invention referring to alternative reactants and to alternative dehalogenating compounds will be referred to in the following further detailed description of the invention.

It has now been discovered that insecticides comprising polychlorinated tetracyclic compounds such as 1,2,3,4,10,10-hexachloro-1,4,4a,5,8,8a - hexahydro - 1,4,5,8-dimethanonaphthalene, known in the trade as "Aldrin," as well as derivatives thereof, may be prepared by condensing a cycloalkadiene with a mono- or dihaloolefin, followed by a condensation of the reaction product with a polyhalocycloalkadiene, and partially dehalogenating the resultant condensation product to yield the desired compound. The term "partial dehalogenation" refers to the complete dehalogenation of one of the tetracyclic rings of the desired product, especially the 6-membered carbon atom ring containing one or two halogen radicals.

The intermediate halogenated bicyclic compounds which are used for the preparation of the compounds of the present invention may be prepared by the condensation of a haloolefin having the formula:

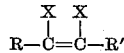

in which R and R' are independently selected from the group consisting of alkyl, haloalkyl and hydrogen radicals and X is independently selected from the group consisting of hydrogen and halogen radicals, at least one X being a halogen, with a conjugated cycloalkadiene, preferably 1,3-cyclopentadiene (hereinafter referred to as cyclopentadiene) and 1,3-cyclohexadiene, or alkyl derivatives thereof such as 1-methylcyclopentadiene, 5-propylcyclopentadiene, 1 - ethylcyclopentadiene, 1,4 - dimethylcyclopentadiene, 1-methyl-2-ethylcyclopentadiene, etc., 1-methyl-1,3-cyclohexadiene, 1-ethyl-1,3-cyclohexadiene, 1,2 - dimethyl-1,3-cyclohexadiene, 1,4-dimethyl-1,3-cyclohexadiene, 5,6-dimethyl-1,3-cyclohexadiene, 1-methyl-2-ethyl-1,3-cyclohexadiene, etc. Cyclopentadiene is preferred because of its relatively greater availability and because it yields a preferred type of bicycloalkadiene, namely a bicyclo [2.2.1]-2-heptene. The haloolefins which are used in the process of this invention comprise haloalkenes in which halogen, preferably chlorine or bromine, is attached to one or both of the doubly bonded carbon atoms, no carbon atom holding more than one halogen atom. Examples of monohaloolefins in which the halogen is attached to one of the doubly bonded carbon atoms include vinyl chloride, vinyl bromide, 1-chloro-1-propene, 1-bromo-1-propene, 2-chloro-1-propene, 2-bromo-1-propene, 1-chloro-1-butene, 1-bromo-1-butene, 2-chloro-1-butene, 2-chloro-2-butene, 2-bromo-2-butene, 1-chloro-1-pentene, 2-chloro-1-pentene, 2-chloro-2-pentene, 3-chloro-2-pentene, 1-bromo-1-pentene, 2-bromo-1-pentene, 3-bromo-2-pentene, etc. Examples of dihaloolefins in which the chlorine or bromine atoms are attached only to doubly bonded carbon atoms include 1,2-dichloroethylene, 1,2-dichloro-1-propene, 1,2-dibromoethylene, 1,2-dibromo-1-propene, 2,3-dibromo-2-butene, 2,3-dichloro-2-butene, 2,3-dibromo - 2 - pentene, 2,3-dichloro-2-pentene, 2,3-dichloro-2-hexene, 3,4-dichloro-3-hexene, 2,3-dibromo-2-hexene, 3,4-dibromo-2-hexene, etc. Examples of haloalkenes in which there is halogen on a saturated carbon atom as well as on a doubly bonded carbon atom are 1,3-dichloro-1-propene, 2,3-dichloro-1-propene, 1,2,3-trichloro-1-propene, 2,3,3,3-tetrachloro-1-propene, etc., 1-chloro-3,3,3-trifluoro-1-propene, 1,2-dichloro-3,3,3-trifluoro-1-propene, etc.

The operating conditions for the condensation of the cycloalkadiene such as cyclopentadiene with the haloolefin will to some extent depend upon the particular compounds employed in the reaction, the temperature for the reaction between the cycloalkadiene and the haloolefin being in the range of from about atmospheric to about 250° C., or more, the preferred range being from about 150° C. to about 200° C. Dicyclopentadiene may also be used instead of cyclopentadiene provided that reaction temperatures above about 180° C. are used. It is often desirable to carry out the condensation of the diene and the haloolefin in the presence of an inert solvent such as a hydrocarbon or an alcohol.

The condensation of a conjugated cyclopentadiene with a mono- or dihaloolefin yields a mono- or dihalobicyclo

[2.2.1]-2-heptene, while condensation of a conjugated cyclohexadiene with a mono- or dihaloolefin yields a mono- or dihalobicyclo-[2.2.2]-2-octene.

The halobicyclo - [2.2.2] - 2 - heptene or halobicyclo [2.2.2] - 2 - octene may then be condensed with polyhalocycloalkadienes such as hexachlorocyclopentadiene, octachloro-1,3-cyclohexadiene, 1,2,3,4-tetrachlorocyclopentadiene, 1,2,3,4 - tetrachloro - 1,3 - cyclohexadiene, 1,2,3,4,5 - pentachlorocyclopentadiene, 1,2,3,4,5-pentachloro-1,3-cyclohexadiene, etc., to form polyhalotetracyclic compounds which are then partially dehalogenated to form compounds in which one of the 6-membered carbon rings is halogen-free. Likewise, the condensation of the polyhalocycloalkadiene with the hereinbefore mentioned condensation product of the cycloalkadiene and the haloolefin is also dependent upon the particular compounds employed in the reaction. The latter condensation process may be carried out at a temperature in the range of from about atmospheric to about 250° C. or more, and preferably in a range of from about 100° C. to about 180° C. In addition, it is often preferred to carry out the condensation of the polyhalocycloalkadiene and the halogenated bicyclic compound in the presence of a diluent, for example, an inert hydrocarbon such as an aromatic hydrocarbon (for example toluene) or a paraffin (for example n-pentane), an alcohol, etc.

The removal of two halogen atoms of the polyhalotetracyclic compounds may be effected by treating said compounds with a dehalogenating metal in a suitable organic solvent including alcohols, ethers, acids, etc. The dehalogenating compounds include in particular members of the right hand column of group II of the periodic table such as magnesium, zinc, and cadmium in an organic solvent such as methyl alcohol, ethyl alcohol, propyl alcohol, ethyl ether, acetic acid, etc. A preferred method consists in treating the tetracyclic compound with magnesium metal and a catalytic amount of magnesium iodide or iodine in an organic solvent such as anhydrous ethyl ether. This reaction is usually carried out at atmospheric pressure and at a temperature in the range of from about 0 to about 50° C., room temperature being preferred. Inasmuch as this particular reaction is exothermic in nature, cooling means must usually be provided in order that the temperature of the reaction be maintained at substantially room temperature during the course of said reaction. Sodium iodide in an alcohol or acetone may also be used as dehalogenating agent.

In the event that it is necessary to remove only one halogen atom from the 6-membered ring of the tetracyclic compound, other dehalogenating agents may be used, said agents including the hydroxides of the alkali metals and alkaline earth metals such as the hydroxides of calcium, barium, strontium, lithium, rubidium, sodium, potassium and cesium, which are usually employed in alcoholic solution. Alcohols utilizable in this reaction include methyl alcohol, ethyl alcohol, n-propyl alcohol, isopropyl alcohol, n-butyl alcohol, isobutyl alcohol, amyl alcohol, etc. It is also contemplated within the scope of this invention that sodamide in an ammoniacal solution may be used as a dehalogenating agent.

The operation conditions of the dehalogenation step of the present process will occur at a temperature depending upon the particular reactant and the solvent used as a medium for the reaction. Suitable temperatures will usually lie in the range of from about 0° C. to about 250° C., the preferred range being from about 35° C. to about 200° C. When the reaction temperature is higher than the boiling point of the alcohol, superatmospheric pressures are employed.

The process of this invention will be effected in any suitable manner and may be either a batch or continuous type operation. When a batch type operation is used, a quantity of the reactants comprising the cycloalkadiene and the haloolefin as well as a diluent if desired are placed in a reactor equipped with a mixing and heating device, and the reactor is heated to the desired temperature while mixing the contents thereof. After a suitable period of time has elapsed, the reactor and the contents are cooled to room temperature after which the desired products are recovered by suitable means, for example, fractional distillation, while the unreacted feed stock may be recharged to the next batch. The desired product may then be placed in the same reactor or, if so desired, a second reactor, and the polyhalocycloalkadiene and diluent, if used, charged thereto. This reactor is then heated to the desired temperature until the reaction is completed, after which the polyhalotetracycloalkene is separated by suitable means, such as by washing with water and fractional distillation and crystallization. The polyhalotetracycloalkene may then be placed in the same reactor or in still a third reactor and the particular dehalogenating agent previously selected is added thereto. This reactor is then heated to the desired temperature until the reaction is completed, after which the partially dehalogenated polyhalotetracycloalkadiene is separated from the unreacted material by the same means hereinbefore set forth.

Another method of operation of the present process is of the continuous type. In one operation, the reactants are charged to a suitable vessel maintained at suitable operationing conditions of temperature and pressure. This vessel may comprise an unlined reactor or may be lined with adsorbent material such as alumina, fire brick, dehydrated bauxite and the like. The desired product is drawn off from the vessel by suitable means and passed into a second reactor also equipped with heating means. The unreacted feed stock comprising the cycloalkadiene and the haloolefin may be recycled for use as a part of the fresh feed stock. The halogenated bicyclic compound prepared in the first reactor is mixed with the polyhalocycloalkadiene and the mixture charged to the second reactor which is maintained at the reaction temperature. The desired polyhalotetracycloalkene is separated from the product withdrawn from the second reactor and charged to a third reactor with the dehalogenating agent and the solvent which acts as a medium in which the dehalogenation takes place. The partially dehalogenated compound is withdrawn from the third reactor and purified by conventional means while the unreacted polyhalotetracycloalkene and the dehalogenating agent may be recycled to form a part of the new feed stock.

The present invention is further illustrated with respect to specific embodiments thereof in the following examples which, however, are not intended to limit the generally broad scope of the present invention in strict accordance therewith.

*Example I*

80 g. of dicyclopentadiene and 150 g. of trans-1,2-dichloroethylene are placed in a rotating autoclave and heated at 180°–200° C. for a period of approximately 5 hours, after which the vessel and its contents are cooled to room temperature and the product subjected to fractional distillation under reduced pressure. The desired product comprising 5,6-dichlorobicyclo [2.2.1]-2-heptene, which boils at 82°–84° C. at 22 mm. mercury pressure (188°–190° C. at 760 mm. pressure) is obtained in 40% yield. A mixture of 32 g. of this dichlorobicycloheptene and 56 g. of hexachlorocyclopentadiene is heated under reflux at atmospheric temperature for 3.5 hours during which the temperature slowly rises from about 100° to about 210° C. At the end of this time, the reactor and its contents are cooled to room temperature and the resulting crystalline mass recrystallized from ethyl alcohol, yielding 64 g. of product melting at 145°–146° C.

Partial dehalogenation of the crystalline product may be accomplished by a number of alternate procedures as outlined above. In one of these, 30 g. of the compound is treated with approximately 10 g. of zinc dust supported in 100 cc. of n-propyl alcohol in a vessel equipped with refluxing and stirring means. The mixture is maintained at a refluxing temperature of approximately 100° C. for about 15 hours. The liquid product obtained from this refluxing is decanted from the excess zinc and the alcohol and other low-boiling constituents are removed by distillation under reduced pressure. After this, the residue is extracted with ethanol and subjected to fractional distillation to recover 1,2,3,4,10,10-hexachloro-1,4,4a,5,8,8a-hexahydro-1,4,5,8-dimethanonaphthalene, M.P. 103°–104° C.

Alternatively, 30 g. of the crystalline octachlorotetracycloalkane is dissolved in 150 g. of anhydrous ethyl ether and the solution is added during one hour to a stirred mixture comprising 12 g. of magnesium turnings in 200 g. absolute ethyl ether to which there had been added 8 g. of iodine. The temperature of the reaction mixture is maintained at 30°–35° C. during the addition after which it is stirred for an additional hour and the ether solution is washed with water, dried, and the ether distilled off. The residue is recrystallized from alcohol to obtain the desired 1,2,3,4,10,10-hexachloro-1,4,4a,5,8,8a-hexahydro-1,4,5,8-dimethanonaphthalene in more than 75% yield.

*Example II*

60 g. of cyclopentadiene and 175 g. of vinyl bromide are placed in a rotating autoclave and heated at a temperature of approximately 180°–200° C. for 5 hours. The vessel and contents thereof are then cooled to room temperature and the reaction product is subjected to fractional distillation under reduced pressure. 5-bromobicyclo [2.2.1]-2-heptene boiling at 67°–68° C. at 21 mm. pressure (170°–171° C. at 760 mm.) is obtained in 63% yield. A solution of 9 g. of the bromobicycloheptene and 13 g. of hexachlorocyclopentadiene in 15 g. of toluene is heated under reflux at 127° C. for about 10 hours. At the end of this time the reactor and contents thereof are cooled to room temperature and subjected to fractional distillation under reduced pressure to remove toulene and unreacted starting materials. The residue is recrystallized from ethanol yielding 11 g. of pale yellow crystals, melting at 174°–175° C. A solution of 10 g. of this crystalline compound and 10 g. of potassium hydroxide in 250 g. of propyl alcohol is heated under reflux for 15 hours. The product is cooled to room temperature, filtered, and the filtrate is subjected to vacuum distillation to remove the alcohol. The residue is dissolved in ether to remove the desired product from excess potassium hydroxide and the ether solution is washed, dried and distilled to remove the ether. The residue is recrystallized, preferably from ethyl alcohol, to yield 1,2,3,4,10,10-hexachloro-1,4,4a,8,8a-hexahydro - 1,4,5,8 - dimethanonaphthalene in about 80% yield.

I claim as my invention:

1. A process for the preparation of a halogenated polycyclic compound from a halogenated tetracyclic compound resulting from the Diels-Alder condensation of a conjugated polyhalocycloalkadiene with a halogenated bicyclic compound obtained by the Diels-Alder condensation of a conjugated cycloalkadiene with a haloolefin having the formula

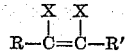

in which R and R' are independently selected from the group consisting of alkyl, haloalkyl and hydrogen radicals and X is halogen, said polyhalocycloalkadiene and said cycloalkadiene each having a ring of from 5 to 6 carbon atoms, which comprises treating said halogenated tetracyclic compound with a dehalogenating metal at a temperature of from about 0° to about 250° C.

2. A process for the preparation of a halogenated polycyclic compound from a halogenated tetracyclic compound resulting from the Diels-Alder condensation of a conjugated polyhalocycloalkadiene having a ring of from 5 to 6 carbon atoms with a halogenated bicyclic compound obtained by the Diels-Alder condensation of cyclopentadiene with a haloolefin having the formula

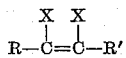

in which R and R' are independently selected from the group consisting of alkyl, haloalkyl and hydrogen radicals and X is halogen, which comprises treating said halogenated tetracyclic compound with a dehalogenating metal at a temperature of from about 0° to about 250° C.

3. A process for the preparation of a halogenated polycyclic compound from a halogenated tetracyclic compound resulting from the Diels-Alder condensation of hexachlorocyclopentadiene with a halogenated bicyclic compound obtained by the Diels-Alder condensation of cyclopentadiene with a haloolefin having the formula

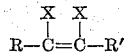

in which R and R' are independently selected from the group consisting of alkyl, haloalkyl and hydrogen radicals and X is halogen, which comprises treating said halogenated tetracyclic compound with a dehalogenating metal at a temperature of from about 0° to about 250° C.

4. A process for the preparation of 1,2,3,4,10,10-hexachloro-1,4,4a,5,8,8a-hexahydro - 1,4,5,8 - dimethanonaphthalene which comprises treating the Diels-Alder condensation product of 5,6-dichlorobicyclo(2.2.1)-2-heptene and hexachlorocyclopentadiene with a dehalogenating metal at a temperature of from about 0° to about 250° C.

5. A process for the preparation of 1,2,3,4,10,10-hexachloro-1,4,4a,5,8,8a-hexahydro - 1,4,5,8-dimethanonaphthalene which comprises treating the Diels-Alder condensation product of 5,6-dichlorobicyclo(2.2.1)-2-heptene and hexachlorocyclopentadiene with zinc and an alcohol at a temperature of from about 0° to about 250° C.

6. A process for the the preparation of 1,2,3,4,10,10-hexachloro-1,4,4a,5,8,8a - hexahydro-1,4,5,8-dimethanonaphthalene which comprises treating the Diels-Alder condensation product of 5,6-dichlorobicyclo(2.2.1)-2-heptene and hexachlorocyclopentadiene with magnesium and a solution of magnesium iodine in ethyl ether at a temperature of from about 0° to about 250° C.

References Cited in the file of this patent

UNITED STATES PATENTS

| | | |
|---|---|---|
| 2,351,311 | Alder et al. | June 13, 1944 |
| 2,635,977 | Lidov | Apr. 21, 1953 |
| 2,635,979 | Lidov | Apr. 21, 1953 |

FOREIGN PATENTS

| | | |
|---|---|---|
| 151,645 | Australia | Mar. 3, 1949 |

OTHER REFERENCES

"Berichte der deut. chem. Gesell.," vol. 45, page 1468.